Patented Aug. 9, 1949

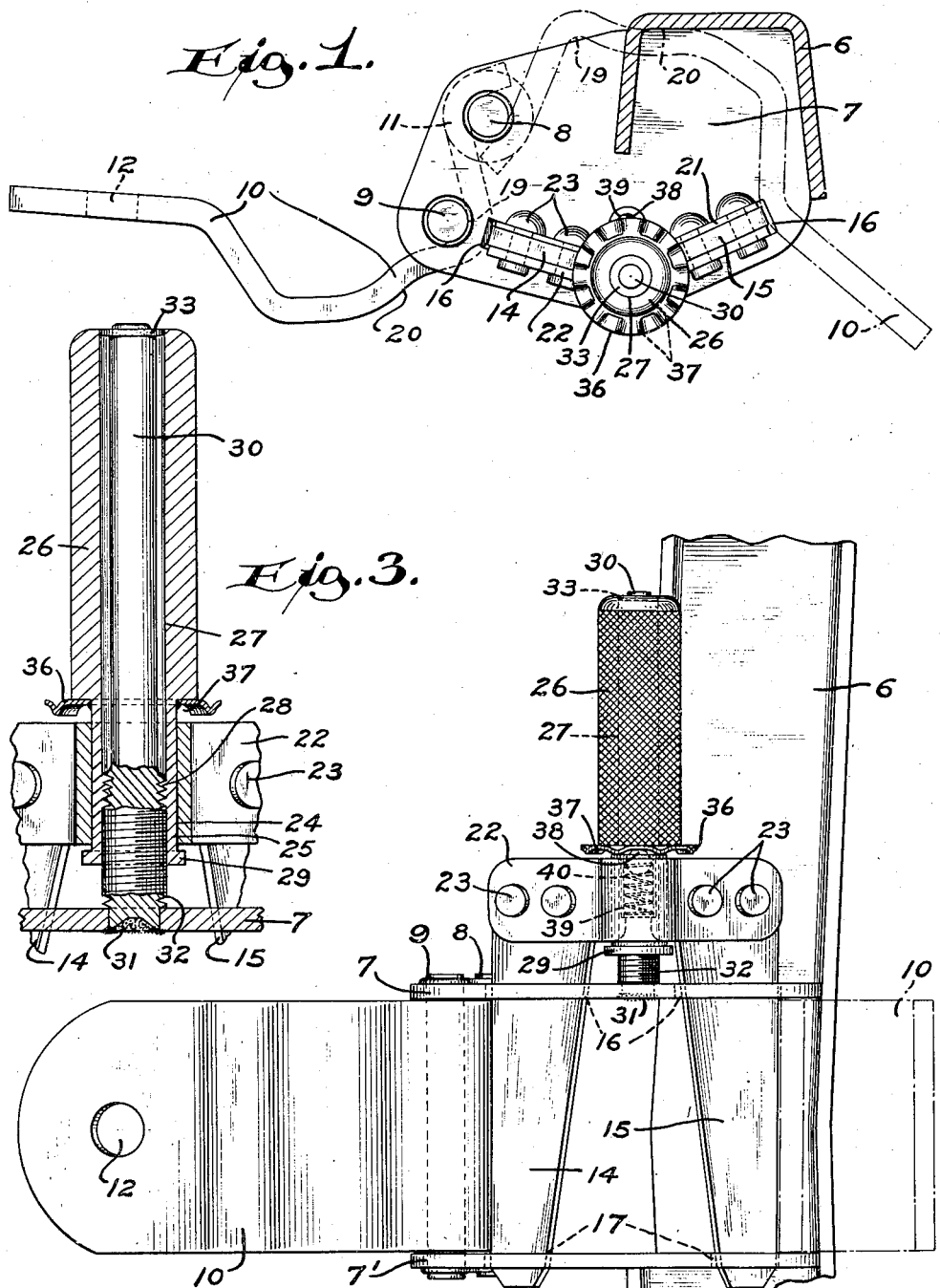

2,478,709

UNITED STATES PATENT OFFICE 2,478,709

VEHICLE DRAWBAR LOCK

Howard C. Riemann, West Milwaukee, and Joel R. Thorp, West Allis, Wis., assignors to The Fulton Company, West Allis, Wis., a corporation of Wisconsin Application June 7, 1946, Serial No. 675,050

10 Claims. (Cl. 280—33.44)

Our invention relates in general to improvements in devices for connecting one vehicle to another, and relates more specifically to improvements in the construction and operation of mechanism for locking a vehicle draw bar in several positions.

The principal object of the present invention is to provide simple and efficient means for locking a vehicle draw bar in either active or inactive position.

Many different types of draw bars for connecting a trailer to a draft vehicle, have heretofore been proposed and used commercially; and as shown in copending application Serial No. 568,576, filed December 18, 1944, now Patent 2,408,531, issued October 1, 1946, it has also been proposed to utilize a flat elongated draw bar pivotally suspended from a transverse bracket carried by an automobile frame near the rear bumper, to connect the automobile to a trailer through an intervening ball coupling. In such a trailer hitch assemblage, it is preferable to have the elongated draw bar carrier bracket concealed by the rear bumper and by the vehicle body, and to so mount the draw bar that it may either be projected rearwardly beyond the adjacent bumper when in active position, or swung forwardly and concealed by the bumper and body together with its suspension bracket when in inactive position. In order to eliminate looseness in the draw bar mounting and resultant rattling, it is desirable to positively lock the draw bar in both active and inactive positions, and this applies to any type of draw bar which is adapted to be disposed in several different positions.

It is therefore a more specific object of our invention to provide an improved device for firmly locking a draw bar or the like in several different positions, as when the draw bar is active or inactive.

Another specific object of this invention is to provide a conveniently manipulable locking assemblage for effectively preventing looseness or rattling of a draw bar when disposed in either active or inactive position.

A further specific object of the invention is to provide improved wedge mechanism for positively and firmly holding a swingable bar in various positions of adjustment relative to its suspension pivot.

Still another specific object of the present invention is to provide a compact and efficient draw bar lock which may be manufactured and sold at moderate cost, and which is adapted for diverse uses.

These and other specific objects and advantages of the invention will be apparent from the following detailed description.

A clear conception of the features constituting the present improvement, and of the manner in which a typical embodiment of the invention may be constructed and utilized, may be had by referring to the drawing accompanying and forming a part of this specification wherein like reference characters designate the same or similar parts in the various views.

Fig. 1 is a side elevation of a typical vehicle draw bar and suspension bracket, showing the draw bar in active position in solid lines, and in inactive position in dot-and-dash lines, and also depicting a section through the suspension bracket;

Fig. 2 is a bottom view of the draw bar assemblage shown in Fig. 1, illustrating only a fragment of the elongated transverse suspension bracket; and Fig. 3 is an enlarged fragmentary view of the improved draw bar lock, showing the manipulating handle in section.

While the invention has been illustrated and described herein as being especially advantageously applicable to a flat elongated vehicle draw bar of the type specifically shown in the above-identified copending application, it is not intended to unnecessarily restrict the scope or utility of the improvement by virtue of this limited disclosure.

Referring to the drawing, the typical improved vehicle draw bar assemblage shown by way of illustration, comprises in general an elongated inverted U-shaped bracket 6 adapted to be firmly attached in any suitable manner to the rear portion of a draft vehicle, and having laterally spaced side plates 7, 7' secured to and extending rearwardly from the medial part thereof; a pivot pin 8 firmly uniting the upper rear portions of the side plates 7, 7'; a stop rod 9 likewise firmly interconnecting the lower rear portions of the side plates 7, 7'; an elongated flat and rather irregular draw bar 10 having an integral loop 11 at one end swingably embracing the pivot pin 8 while its opposite swinging end is provided with an opening 12 for attachment of a trailer thereto; and a wedge lock carried by the side plate 7 and having two independent wedges 14, 15 cooperable with the draw bar 10 and with long and short slots 16, 17 in the two side plates 7, 7' to interchangeably lock the bar 10 in either active position as shown in solid lines, or inactive position as shown in dot-and-dash lines.

When applied to standard automobiles, the transverse bracket 6 of the hitch, is firmly secured to the vehicle frame in front of the rear bumper, and both the bracket 6 and its side plates 7, 7' are normally concealed from view by the rear bumper bar and the rear splash plate of the car body, so that access to the hitch may be gained only from beneath. The bracket 6 may be formed of channel bar stock or from metal plate bent into U-shape with the aid of a punch, and the side plates 7, 7' may be formed of sturdy metal plate welded to the channel bar. The pivot pin 8 is normally disposed beneath the rear splash plate and forwardly of and above the lower edge of the bumper bar, thus making it necessary to distort the medial portion of the draw bar 10 as shown, in order that this bar may clear the bumper when in active position as shown in solid lines. The draw bar 10 is preferably formed of heavy metal stock, and has a medial socket portion 19 adapted to be firmly clamped against the stop rod 9 by the wedge 14 when the draw bar is in use, and is also provided with a flat medial portion 20 adapted to be clamped against the top of the bracket 6 by the other wedge 15 when the bar 10 is not in use.

The two wedges 14, 15 of the improved draw bar lock, and which coact with the slots 16, 17 of the side plates 7, 7' when in locking position, are also formed of heavy metal, and are secured at their outer wider ends to a pair of connecting straps 21, 22, by means of rivets 23. The medial portions of the straps 21, 22 form a bore 24, within which the inner reduced end 25 of a wedge manipulating handle 26 is journalled for rotation, and this handle 26 is provided with a central bore 27 and with internal screw threads 28 within the reduced end 25, the latter extending inwardly beyond the bore 27 and providing a stop abutment for the handle 26. The handle 26 is also provided with a flange 29 engaging the straps 21, 22, and is mounted upon a shaft 30 one end of which is rigidly secured to the side plate 7 by a weld 31 and is also provided with external screw threads 32 normally coacting with the screw threads 28. The fixed shaft 30 extends through the handle bore 27 and has a stop washer 33 secured to its outer end, this washer 33 being adapted to engage the abutment formed by the internal screw threads 28 of the handle 26 when these threads have been disengaged from the shaft threads 32 for withdrawal of the wedges 14, 15, see Fig. 3.

With the foregoing assemblage of elements, the wedges 14, 15 may obviously be simultaneously withdrawn from the slots 17 and from the space between the side plates 7, 7', by merely unscrewing the threads 28 from the threads 32 and by thereafter sliding the handle 26 along its supporting shaft 30 until the abutment formed by the internal threads 28 engages the stop washer 33, whereupon the handle will be stopped and the narrower ends or tips of the wedges 14, 15 will lie within the wider slots 16 of the side plate 7 and the draw bar 10 will be free to be swung between the plates 7, 7'. However, when the screw threads 28, 32 are brought into engagement with each other by sliding the handle 26 in the opposite direction and by rotating it about the shaft 30, then the wedges 14, 15 will be driven into the slots 16, 17 and against the draw bar 10 as indicated in Fig. 1, so as to firmly lock the draw bar in either active or inactive position; and in order to retain the parts in locked position, the handle 26 is provided with a serrated plate 36 welded thereto and provided with detents 37 adapted to be engaged by a latch ball 38 which is confined within a socket 39 formed in the strap 21 and is forced outwardly by a compression spring 40. When the wedges 14, 15 have been driven home, the ball 38 will engage the nearest detent and will frictionally but firmly hold the handle 26 in position, thus preventing undesirable loosening of the wedges 14, 15, see Figs. 1 and 2.

During normal use of the improved draw bar and locking assemblage, after the various elements have been properly constructed and assembled, the bracket 6 may be secured to the automobile frame so that it together with the side plates 7, 7' and the pin 8 and stop rod 9 will be concealed by the vehicle rear splash plate and bumper, in a well known manner. The draw bar 10 may thereafter be positioned and locked, either in active position extending rearwardly of and beneath the rear bumper as shown in solid lines in Figs. 1 and 2, or in inactive inverted and concealed position as shown in dot-and-dash lines, and this alternate positioning of the bar 10 may be readily and quickly effected by merely unscrewing the threads 28 of the handle 26 from the threads 32 of the fixed shaft 30 and by thereafter sliding the handle 26 outwardly until the abutment threads 28 engage the stop washer 33. This outward sliding motion of the handle 26 will cause the flange 29 at the inner end thereof to engage the straps 21, 22 and to withdraw the wedges 14, 15 from within the space between the side plates 7, 7', thus releasing the draw bar 10 and permitting it to be swung freely about its pivot pin 8 and within this space to either active or inactive position. When the draw bar has been temporarily positioned with its socket portion 19 against the stop pin 9 and the handle 26 and wedges 14, 15 are moved inwardly, and the handle is subsequently screwed onto the shaft threads 32, the draw bar 10 will be firmly clamped against the stop rod 9 and locked in active position by the latch ball 38; whereas, if the draw bar 10 is temporarily positioned with its medial portion 20 in contact with the top of the bracket 6 and the handle 26 is likewise applied to the shaft threads 32, the bar 10 will be firmly clamped against the bracket 6 and locked in inactive position by the latch ball 38.

From the foregoing detailed description it will be apparent that the present invention provides an improved vehicle draw bar lock, which besides being simple and compact in construction is conveniently manipulable to firmly maintain the draw bar in several different positions of adjustment. The improved locking assemblage may obviously be applied to various types of swingable draw bars and the wedges 14, 15 may be positioned in any desired radial planes relative to the axis of the handle 26 and shaft 30, thus making the improvement flexible in its adaptations. The clamping wedges 14, 15 cooperate with the slots 16, 17 and with the stop rod 9 and bracket 6 to firmly clamp the draw bar 10 in the several different positions and the ball latch 38 effectively locks the parts in clamping position and positively prevents looseness and resultant rattling. The improvement has proven highly successful and satisfactory in actual use, and may be manufactured and applied to the trailer hitches at moderate cost.

It should be understood that it is not desired to limit this invention to the exact details of

We claim:

1. A draw bar lock comprising, a supporting bracket having side plates provided with slots, a draw bar pivotally suspended from said bracket side plates, a plurality of wedges cooperable with said slots and with said draw bar to clamp the latter in either active or inactive position, a single handle for manipulating all of said wedges, and a latch coacting with said handle to maintain the same in the several positions of adjustment.

2. A draw bar lock comprising, a supporting bracket having laterally spaced side plates, a draw bar pivotally suspended from said bracket and being swingable in the space between said plates from active to inactive position and vice versa, a pair of wedges cooperable with said side plates and with said draw bar to clamp the latter in either of said positions, and a handle cooperating with said draw bar and with said bracket to move said wedges into and out of said space and to clamp said draw bar in either of said positions.

3. A draw bar lock comprising, a supporting bracket having laterally spaced side plates, a draw bar pivotally suspended from said bracket and being swingable in the space between said plates from active to inactive position and vice versa, a pair of wedges cooperable with said side plates and with said draw bar to clamp the latter in either of said positions, a handle cooperating with said draw bar and with said bracket to move said wedges into and out of said space and to clamp said draw bar in either of said positions, and a latch coacting with said handle to maintain the same in several positions of adjustment.

4. A draw bar lock comprising, a supporting bracket having laterally spaced side plates one of which is provided with a threaded shaft extending outwardly therefrom, and both of which are provided with alined slots, a draw bar swingably suspended between said plates, a pair of wedges coacting with said slots and being cooperable with said slots to clamp said draw bar in either active or inactive position, and means coacting with the screw threads of said shaft for actuating said wedges.

5. A draw bar lock comprising, a supporting bracket having laterally spaced side plates one of which is provided with a threaded shaft extending outwardly therefrom, and both of which are provided with alined slots, a draw bar swingably suspended between said plates, a pair of wedges coacting with said slots and being cooperable with said slots to clamp said draw bar in either active or inactive position, and a handle having screw threads cooperable with said shaft threads and being movable along the shaft to move said wedges into and out of said slots.

6. A draw bar lock comprising, a supporting bracket having laterally spaced side plates one of which is provided with a threaded shaft extending outwardly therefrom, and both of which are provided with alined slots, a draw bar swingably suspended between said plates, a pair of wedges coacting with said slots and being cooperable with said slots to clamp said draw bar in either active or inactive position, a handle having screw threads cooperable with said shaft threads and being movable along the shaft to move said wedges into and out of said slots, and a latch cooperable with said handle to maintain the same in various positions of adjustment.

7. A draw bar lock comprising, a supporting bracket having a side plate and a shaft projecting from one side of the plate, said plate having slots therein radiating from said shaft, a draw bar pivotally suspended from said plate to swing along the opposite side of the latter, a pair of wedges coacting with said slots and being cooperable with said draw bar to clamp the same in either active or inactive position, and a handle having screw threads cooperable with the threads of said shaft to drive said wedges into clamping position.

8. A draw bar lock comprising, a supporting bracket having a side plate and a shaft projecting from one side of the plate, said plate having slots therein radiating from said shaft, a draw bar pivotally suspended from said plate to swing along the opposite side of the latter, a pair of wedges coacting with said slots and being cooperable with said draw bar to clamp the same in either active or inactive position, a handle having screw threads cooperable with the threads of said shaft to drive said wedges into clamping position, and a latch carried by said wedges and coacting with said handle to maintain the latter in various positions.

9. A draw bar lock comprising, a supporting bracket having a side plate and a shaft projecting from one side of the plate, said plate having slots therein radiating from said shaft, a draw bar pivotally suspended from said plate to swing along the opposite side of the latter, a pair of wedges coacting with said slots and being cooperable with said draw bar to clamp the same in either active or inactive position, a handle having screw threads cooperable with the threads of said shaft to drive said wedges into clamping position, and a stop on said shaft cooperable with the screw threads of said handle to limit the movement of the handle away from said plate.

10. A draw bar lock comprising, a bracket having spaced side plates provided with alined slots, a draw bar swingably suspended from said bracket side plates, wedge means slidably cooperable with said slots and with said draw bar to clamp the latter in either active or inactive position, means for shifting said wedge means within said slots back and forth across the space between said side plates, and latch means coacting with said shifting means to maintain the draw bar in either of said positions.

HOWARD C. RIEMANN.
JOEL R. THORP.

REFERENCES CITED

The following references are of record in the file of this patent:

UNITED STATES PATENTS

| Number | Name | Date |
|---|---|---|
| 2,408,531 | Riemann et al. | Oct. 1, 1946 |